United States Patent Office 3,293,536
Patented Dec. 20, 1966

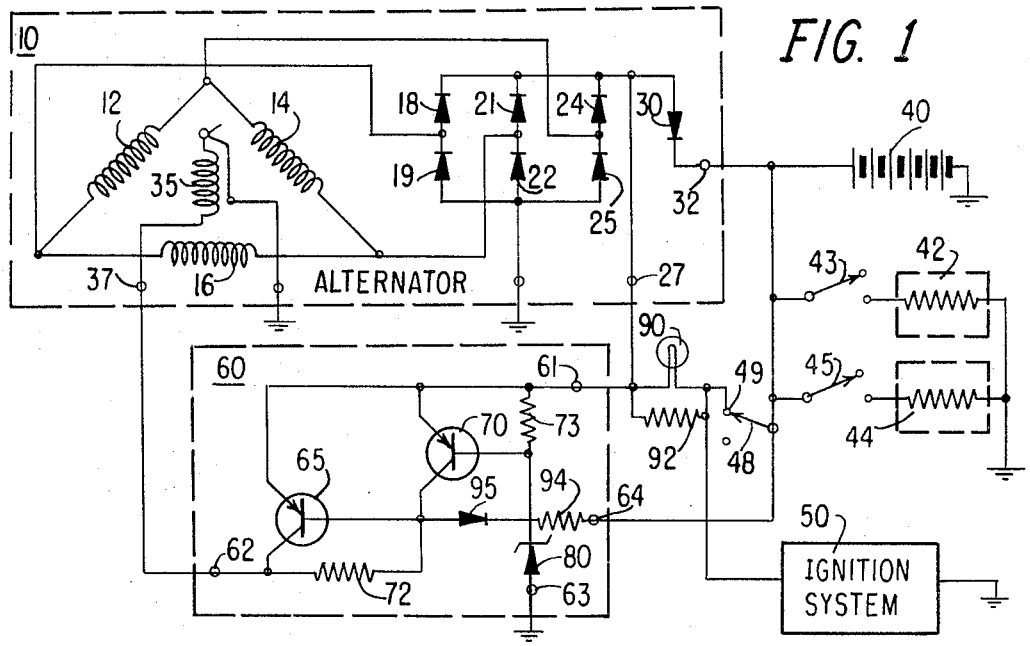
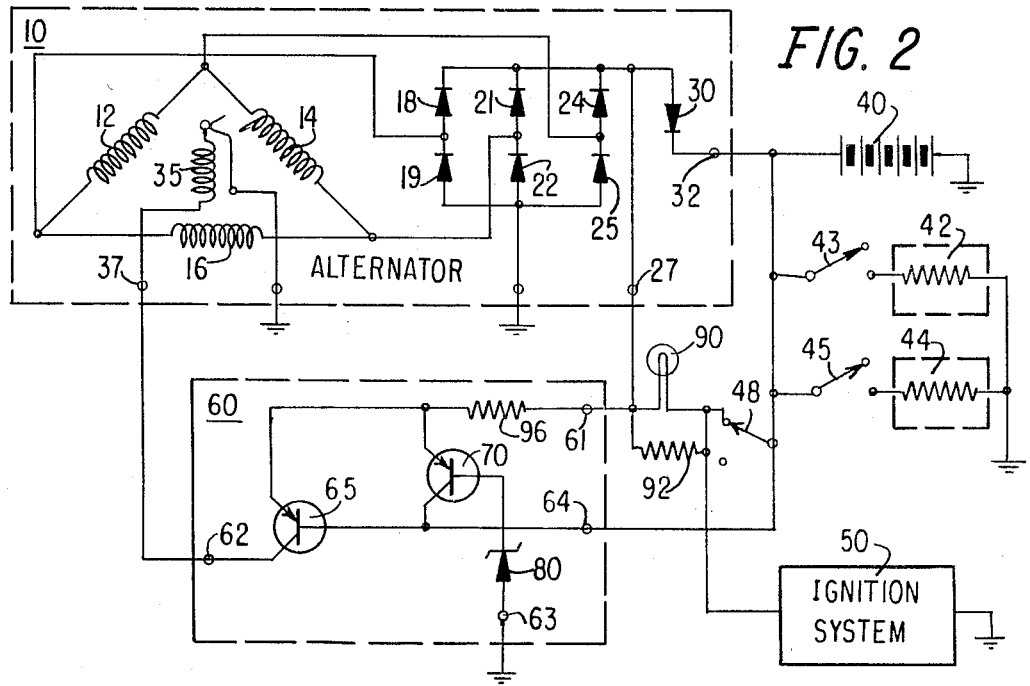

3,293,536
ELECTRONIC VOLTAGE REGULATOR WITH OUTPUT TRANSISTOR BIASED BY ISOLATION DIODE
Theodore A. Byles, Villa Park, Ill., assignor to Motorola, Inc., Franklin Park, Ill., a corporation of Illinois
Filed June 10, 1963, Ser. No. 286,745
4 Claims. (Cl. 322—28)

This invention relates to vehicular electrical systems and more particularly to the voltage regulation of an electrical generating device in such a system.

With the advent of better and cheaper semiconductor devices, electronic circuits are being increasingly incorporated in vehicular electrical systems, especially for use with internal combustion engines. Because these electrical generating devices are driven by a variable speed engine, they must be regulated to prevent high voltages from damaging the battery. Transistorized voltage regulators are often used in such systems to regulate the output of a battery charging generator which may be either a D.C. generator or an alternator and rectifier system. A transistorized voltage regulator usually incorporates an output transistor controlled by a voltage sensing circuit responsive to the output voltage of the generating device being regulated, and this output transistor must be forward biased to conduct excitation current to the field of the generator. As a result, a conventional bias circuit is used, a continual power loss of perhaps 2 to 3 watts occurs through dissipation of heat in the biasing resistors.

In vehicular electrical systems using D.C. generators connected to charge a storage battery, an isolation device is generally needed between the generator and the storage battery to prevent current drain when the battery is not being charged. This device may be a silicon diode poled to conduct to the battery and to prevent conduction from the battery to the generator. In systems utilizing an alternator with output rectifiers, the rectifiers themselves prevent current drain to the alternator when the battery is not being charged. Nevertheless an isolation diode may be used to isolate the output voltage at the rectifiers from the voltage at the battery so that the regulator will sense only the alternator output and not the battery terminal voltage. In the case of either the D.C. generator or the alternator systems, there is a constant voltage drop across the isolation diode when the battery is being charged, which drop may be in the order of 0.8 to 1.2 volts for conventional silicon diodes. Here therefore is a second cause of power loss in a vehicular electrical system.

Accordingly, it is an object of this invention to provide a transistorized voltage regulator system for use with a vehicular electrical system which regulator has reduced power loss.

Another object of the invention is to provide an improved low cost voltage regulator for use in a vehicular electrical system.

Still another object of the invention is to provide a voltage regulator system utilizing the voltage drop across an isolation diode to provide a bias voltage for the system.

A feature of the invention is the provision of a voltage regulator, for an electrical generating device connected to a storage battery through an isolation diode, which regulator, for an electrical generating device connected biased by the voltage across the isolation diode.

Another feature of the invention is the provision, in a vehicular electrical system, of an alternator with a rectified output connected to a storage battery through an isolation diode, and of a regulator for the alternator which includes an output transistor forward biased by the isolation diode.

In the drawing:
FIG. 1 is a schematic diagram of a vehicular electrical system constructed in accordance with the invention; and
FIG. 2 is a schematic diagram of a second embodiment of the invention.

In accordance with the invention, a vehicular electrical system includes an isolation diode connected in series between a voltage producing device, such as an alternator or D.C. generator, and a storage battery. A voltage regulator includes an output transistor connected from the output of the voltage producing device to an excitation winding in the voltage producing device, and a voltage sensing circuit is connected to the output transistor. The sensing circuit is responsive to a voltage at the output of the voltage producing device which exceeds a predetermined level to apply cut off bias to the output transistor. The output transistor is forward biased by connection across the isolation diode. Although the isolation diode itself may perform different functions according to whether it is used in a system incorporating a D.C. generator or an alternator and associated rectifiers, in either case a voltage drop exists across the isolation diode when current is flowing therethrough. This drop may be utilized in accordance with the invention to forward bias the output transistor of the regulator.

In FIG. 1, an alternator 10, which may be driven from the engine of a vehicle in which the electrical system is incorporated, includes armature windings 12, 14 and 16 connected in delta. As an alternative, a wye connection could also be used. The corners of the delta are connected to the respective interconnections of the power rectifier pairs 18, 19, and 21, 22, and 24, 25. The equivalent of the anodes of the rectifiers 19, 22 and 25 are interconnected to the frame of the alternator which forms a reference ground. The equivalent of the cathodes of rectifiers 18, 21 and 24 are interconnected to an intermediate output terminal 27 of the alternator. A direct current voltage, positive with respect to the reference point, appears at terminal 27 as a result of full wave rectification of the three phase output of the armature windings 12, 14 and 16 by the bank of rectifiers.

An isolation diode 30, which may be included with rectifiers 18, 19, 21 and 22, and 24, 25 as a structural part of the alternator 10, is connected between the output terminal 27 and the further output terminal 32. The diode 30 is poled to provide conduction from the alternator to the output terminal 32. A field winding 35 of the alternator is connected through the usual slip rings and brushes to the ground conductor or reference frame of the alternator, and to a field current supply terminal 37.

A storage battery 40, having a nominal voltage of 12 volts, may be connected between the output terminal 32 of the alternator and the reference point of the electrical system. Various items of electrical equipment may be connected to the battery 40, and these are represented by an electrical load 42 series connected with a control switch 43, and an electrical load 44 series connected with switch 45. The electrical loads 42, 44 represent such items such as a starter, lights, windshield wipers, a radio and various other pieces of electrical equipment used on a vehicle.

An ignition switch 48 includes a movable contact connected to the positive terminal of battery 40 and a fixed contact 49 connected to the ignition circuit 50 for an internal combustion engine of the vehicle. An indicator light 90, sometimes referred to as a no charge or tell-tale light, is connected between the intermediate alternator terminal 27 and the fixed terminal 49 of the ignition switch 48. This lamp may be shunted by a resistor 92. It is the purpose of light 90 to indicate whether or not the alternator is properly charging the battery.

A transistorized voltage regulator 60 has an input terminal 61 connected to the intermediate terminal 27 of the alternator 10. The regulator further includes a field current supply terminal 62 connected to the terminal 37 of the alternator. Regulator 60 is connected to ground or the reference point for the electrical system through ground terminal 63. A bias supply terminal 64 is connected to terminal 32 of the alternator 10.

It may be seen that the PNP power transistor 65 of the regulator 60 has a collector electrode connected to terminal 62 and an emitter electrode connected to the terminal 61. Accordingly, the emitter-collector current path of transistor 65 conducts current from the intermediate output terminal 27 of the alternator to the field winding 35 of the alternator.

The current or potential for the base electrode of transistor 65 is varied in response to the output voltage of the alternator 10 at its terminal 27 in order to control the current in field winding 35 for regulating the alternator output to a substantially constant voltage. A base control circuit for transistor 65 is established by the emitter collector electrode current path of PNP control transistor 70 and the resistor 72 which are connected in series between terminal 61 and terminal 62. The junction of the collector of transistor 70 and the resistor 72 is connected to the base of transistor 65.

A voltage divider including resistor 73 and zener diode 80 in series is connected between terminal 61 and terminal 63. The junction of resistor 73 and diode 80 is connected to the base electrode of transistor 70. When the potential at terminal 61 rises to a level sufficient to cause reverse conduction of diode 80, there will be a voltage drop across resistor 73 which forward biases transistor 70 into conduction. Conduction of transistor 70 will place cut off potential on the base of transistor 65 and thus reduce the current supplied to the rotating field winding 35 of the alternator. With reduced field current, the output potential of the alternator will decrease so that the potential on regulator terminal 61 is low enough to cause cut off of the diode 80 and resultant decrease in conduction of transistor 70 and corresponding increase in the conduction of transistor 65. This will bring about an increased current applied to the field winding 35, causing the voltage output of the alternator to again increase. Such cycling of the alternator output potential above and below the established regulation point of the regulator 60 will continue at a faster or slower rate depending upon the speed at which the alternator turns, and upon its output voltage. Accordingly, the current through the field winding 35 is averaged to provide a regulated potential from the alternator.

During the period in which transistor 70 is non-conductive, transistor 65 must be forward biased to conduction in order to energize field windings 35. Circuits employing conventional resistor voltage dividers for forward biasing transistor 65 contribute to a power loss through heat dissipation. Furthermore, diode 30, which may be of the silicon type and have a voltage drop of approximately 0.8 to 1.2 volts throughout a fully practical range of current, also contributes to an overall power loss in the system. In accordance with the invention, the voltage drop across diode 30 is utilized to forward bias transistor 65. The potential on the emitter electrode of transistor 65 is that of terminal 61 and the base electrode is connected to terminal 64 through protecting resistor 94 and diode 95. This places the base electrode of transistor 65 at the potential of terminal 32 when transistor 70 is cut off.

During starting, of course, alternator 10 will have no current through field winding 35 because no voltage drop will exist across diode 30, placing no forward bias on transistor 65. Accordingly, alternator 10 should be of the self-starting type wherein field winding 35 would have sufficient magnetic retentivity to produce an initial output voltage for rectification by the diode pairs.

Referring now to FIG. 2, an alternative embodiment of the invention is shown. A dropping or load resistor 96 is connected between terminals 61 and the emitter electrode of transistor 70. Resistor 73 of the circuit of FIG. 1 has been eliminated. In this embodiment, diode 80 will break down when the emitter potential of transistor 70 exceeds its zener level. Once diode 80 is broken down, transistor 70 will conduct to cut off transistor 65 in the manner previously described. It should be noted that resistor 72 of FIG. 1 has also been eliminated in the embodiment of FIG. 2, and that the base of transistor 65 is directly connected to terminal 64. Aside from these described modifications, the embodiment of FIG. 2 operates in substantially the same manner as the embodiment of FIG. 1.

It may therefore be seen that the invention provides an improved transistorized regulator incorporated in a vehicular electrical system wherein the voltage drop across the isolation diode is utilized to forward bias the output transistor of the regulator, thereby reducing overall power loss in the system.

I claim:

1. A voltage regulator for use in a vehicular electrical system which incorporates a voltage producing device with an excitation winding therein and which further incorporates an isolation diode connecting the voltage producing device in series with a storage battery, said voltage regulator including in combination, a first output transistor having base, emitter and collector portions, said emitter and collector portions thereof being adapted for connection in series between the output of the voltage producing device and the excitation winding thereof, a voltage sensing circuit including a second control transistor connected to said base portion of said output transistor and providing cut off bias thereto when the voltage at the output of the voltage producing device exceeds a predetermined level, and conductor means for connecting said base and emitter portions of said output transistor across the isolation diode and forming a series connection between the voltage producing device and the storage battery, so that the voltage drop across the isolation diode acts to forward bias said output transistor.

2. A voltage regulator for use in a vehicular electrical system which incorporates a voltage producing device with an excitation winding therein and which further incorporates an isolation diode connecting the voltage producing device in series to a storage battery, said voltage regulator including in combination, an output transistor having base, emitter and collector portions, said emitter and collector portions being adapted for connection in series between the output of the voltage producing device and the excitation winding thereof, a control transistor connected to said base portion of said output transistor and providing cut off bias thereto when rendered conductive, voltage sensing means connected to said control transistor and responsive to a predetermined voltage at the output of the voltage producing device to render said control transistor conductive, and conductor means for connecting said base and emitter portions of said output transistor across the isolation diode to utilize the voltage drop thereacross to forward bias said output transistor.

3. A vehicular electrical system for use with an internal combustion engine, including in combination, a voltage producing device having an excitation winding therein, a storage battery, an isolation diode connected in series between the output of said voltage producing device and said storage battery and poled to conduct current to the latter for charging the same, an output transistor having base, emitter and collector portions, said emitter and collector portions being connected in series between the output of said voltage producing device and said excitation winding thereof, a voltage sensing circuit connected to said base portion of said transistor and providing cut off bias thereto when the voltage at the output of said voltage producing device exceeds a predetermined level, and conductor means connecting said base and emitter portions of said transistor across said isolation diode and forming a series connection between the voltage producing device and the storage battery, so that the voltage drop across the isolation diode acts to forward bias said transistor.

4. A vehicular electrical system for use with an internal combustion engine, including in combination, an alternator having a field winding therein and rectifier means producing a D.C. output, a storage battery, an isolation diode connected in series between said rectifier means and said storage battery and providing charging current to the latter, a first transistor having base, emitter and collector portions, said emitter and collector portions being connected in series between said rectifier means and said field winding, a second transistor connected to the base of said first transistor and providing cut off bias thereto when rendered conductive, voltage sensing means connected to said second transistor and responsive to an output voltage of a predetermined level at said rectifier means to render said second transistor conductive, conductor means connecting said emitter portion of said first transistor to the output of said rectifier means, and a protective diode and a resistor connected in series between said base portion of said first transistor and said storage battery so that said base and emitter portions of said first transistor are connected across said isolation diode to utilize the voltage drop thereacross to forward bias said first transistor.

References Cited by the Examiner
UNITED STATES PATENTS
3,025,449   3/1962   Luscher.

MILTON O. HIRSHFIELD, *Primary Examiner.*

J. J. SWARTZ, *Assistant Examiner.*